United States Patent [19]

Davis

[11] Patent Number: 4,901,466

[45] Date of Patent: Feb. 20, 1990

[54] FISHING LURE TREATMENT

[76] Inventor: Raymond K. Davis, 40 Edgewood Dr., Lawrenceburg, Ind. 47025

[21] Appl. No.: 189,538

[22] Filed: May 3, 1988

[51] Int. Cl.$^4$ ............................................. A01K 85/01
[52] U.S. Cl. ................................................ 43/4.5; 43/4
[58] Field of Search ................. 43/4.5, 42.06, 42.53, 43/4, 17.1, 17.5, 17.6, 42; 126/263; 252/70

[56] References Cited

U.S. PATENT DOCUMENTS

| 3,403,466 | 10/1968 | Young | 43/4 |
|---|---|---|---|
| 3,461,073 | 8/1969 | Crowell, Jr. et al. | 252/70 |
| 3,476,493 | 11/1969 | Moore | 43/17.5 |
| 3,535,246 | 10/1970 | Crowell, Jr. | 126/263 |
| 3,585,982 | 6/1971 | Hollinshead | 126/263 |
| 3,605,316 | 9/1971 | Rogers | 43/42.06 |
| 3,973,349 | 8/1976 | England | 43/4 |
| 4,245,420 | 1/1981 | Carr | 43/42.06 |
| 4,463,018 | 7/1984 | Carr | 426/1 |
| 4,530,179 | 7/1985 | Larew | 43/42.06 |

FOREIGN PATENT DOCUMENTS 2011057  7/1979  United Kingdom ................ 126/263

OTHER PUBLICATIONS

Carr et al,: Chemical Stimulation of Feeding Behavior in the Pinfish, Lagodon Rhomboides: A New Approach to an Old Problem, Comp. Biochem. Physiol., vol. 54A, pp. 161–166 (1976).
Carr et al: Chemical Stimulation of Feeding Behavior in the Pinfish: Characterization and Identification of Stimulatory Substances Extracted from Shrimp, Comp. Biochem. Physiol., vol. 54A, 437–441 (1976).
Carr et al: Chemoreception and Feeding Behavior in the Pigfish, Orthopristis Chrysopterus: Characterization and Identification of Stimulatory Substances in a Shrimp Extract, Comp. Biochem. Physiol., vol. 55A, pp. 153–157 (1976).
Carr et al: Chemoreception in the Pigfish, Orthopristis Chrysopterus: The contribution of Amino Acids and Betaine to Stimulation of Feeding Behavior by Various Extracts, Comp. Biochem. Physiol., vol. 58A, pp. 69–73 (1977).
R. J. Behnke: How a Trout Sees, Trout, Summer 1987, pp. 32–39.

Primary Examiner—Nicholas P. Godici
Assistant Examiner—James Miner
Attorney, Agent, or Firm—Wood, Herron & Evans

[57] ABSTRACT

A treatment for a fishing lure is formed by the combination of a water insoluble carrier such as silicone grease and a water soluble chemical composition. The water soluble chemical composition is one which upon solution with water generates heat. Particularly suitable chemical compositions include sodium hydroxide and magnesium chloride. The treatment is applied to a fishing lure such as a fly. The fly is cast into water and the physical action of the water causes the chemical composition to be exposed to water thereby dissolving the chemical composition. As the chemical composition dissolves it generates heat at the surface of the lure. This heat is detected by fish which strike at the lure. This treatment is effective for a wide variety of lures and for catching a wide variety of different fish species.

7 Claims, No Drawings

FISHING LURE TREATMENT

Fishing using artificial lures generally employs the use of an object which is intended to be bitten or swallowed by a fish in combination with a hook which is intended to of course snag the fish. There are a variety of different objects that have been used as fishing lures some intended to resemble natural objects such as flies, frogs, worms and the like and others that are less similar to natural objects such as spoons and the like. For whatever reason these seem to be successful in attracting fish. The eyesight of trout is discussed in Trout, summer 1987, pp 32–39.

In addition to physical objects there have been a number of attempts to improve the physical object's ability to attract fish. For example, Carr U.S. Pat. No. 4,245,420 and Carr U.S. Pat. No. 4,463,018 disclose as artificial bait a water soluble matrix having an attractant which is permeable by diffusion at a controlled rate. The attractants can be liquified fish, anise or synthetic attractants. Other attractants are disclosed in the following publications:

Carr et al, "Chemical Stimulation of Feeding Behavior in the Pinfish, Lagodon rhomboides: A New Approach To An Old Problem", *Comp. Biochem. Physiol.*, Vol. 54A, pp 161–166 (1976);

Carr et al, "Chemical Stimulation of Feeding Behavior in the Pinfish, Lagodon rhomboides: Characterization and Identification of Stimulatory Substances Extracted From Shrimp" *Comp. Biochem. Physiol.*, Vol. 54A, pp 437–441 (1976);

Carr et al, "Chemoreception and Feeding Behavior in the Pigfish, Orthopristis chrysopterus: Characterization and Identification of Stimulatory Substances in a Shrimp Extract", *Comp. Biochem. Physiol.*, Vol. 55A, pp 153–157 (1976);

Carr et al, "Chemoreception in the Pigfish, Orthopristis chrysopterus: The Contribution of Amino Acids and Betaine to Stimulation of Feeding Behavior by Various Extracts", *Comp. Biochem. Physiol.*, Vol. 58A, pp 69–73 (1977).

LaRue U.S. Pat. No. 4,530,179 describes a lure formed from a vinyl plastisol in combination with sodium chloride which gives the lure a salty taste. The salty taste is designed to attract fish.

U.S. Pat. No. 3,403,466 discloses injecting and attracting into a worm. Rogers U.S. Pat. No. 3,605,316 discloses cotton seed fish bait tablets.

Further, fly fishermen typically treat their flies with a oily substance which is designed to prevent the surface of the lure from being wetted. These can include odiferous attractants such as fish oil.

All of these attractants rely on odor or taste to attract a fish. The fly treatments may not be intended to attract fish but simply to protect the appearance of the fly.

SUMMARY OF THE INVENTION

The present invention is premised on the realization that the heated surface of a lure can be used as an attractant for a fish. More particularly, the present invention is premised on the realization that a heat generating lure treatment can be used to attract fish. Such a lure treatment includes a water soluble, solid chemical composition which upon dissolving in water generates heat. This water soluble chemical composition is mixed with a carrier which is a hydrophobic gel and is applied to the fish lure. The action of the water against the gel slowly acts to expose the water soluble composition to water which permits the composition to dissolve and thus generate heat at the surface of the lure. The generated heat attracts fish and improves fishing results.

The objects and benefits of the present invention will be further appreciated in light of the following detailed description.

DETAILED DESCRIPTION OF THE INVENTION

The present invention is a combination of a carrier and a water soluble chemical composition which upon dissolution in water generates heat.

Generally this carrier must not contain water, must be hydrophobic, must act to coat the water soluble chemical composition and bind it to the lure. Accordingly, it must have a certain degree of tack and maintain this on application. The carrier acts to bond the exothermic composition to the lure and provides a means to gradually disperse the chemical composition when the treatment is in water.

For purposes of the present invention the carrier must be an oil or a gel-like material which is not solid at water temperature generally from 1° to 30° C. A number of polymeric and naturally occurring materials can be used for purposes of the present invention.

Suitable materials would include natural products such as waxes, hydrocarbon greases, (less preferably hydrocarbon oils) and animal and vegetable fats. The waxes which are acceptable should be lower molecular weight waxes that have a low viscosity at application temperatures. Mixtures of these are also suitable such as a combination of mineral oil parrafin, petrolatum, carotene and ceresin. A product formed from these components is Alboline brand Liquifying Cleanser which is typically used as a fly treatment.

Other carriers which would be suitable for the present invention would be naturally occurring polymers which are insoluble or very slightly soluble in water. Also suitable carriers are low molecular weight polymers which are in a gel-like state such as polyvinyl pyrrolidone, very low molecular weight synthetic polymer gels such as rubbers and butyl rubbers, and silicones. Exemplary of such silicones is Dow Corning 200 Fluid which is a polydimethylsiloxane having a viscosity of 60,000 to 100,000 centistokes.

The water soluble chemical composition used in the present invention must be one which upon dissolving in water generates heat. Basically it must be exothermic. This means that the heat of solution at infinite dilution must be negative. This indicates an exothermic reaction occurring. Also the chemical composition should be very soluble in water. In addition to being very soluble in water it must generate sufficient heat to be noted by the fish.

It is generally preferred that the heat of dilution to infinity of the chemical composition be at least $-0.5$ kcal/mole and more preferably at least $-10$ kcal/mole. Generally chemical compositions which have a heat of dilution to infinity of $-35$ to $40$ kcal/mole are very suitable for use in the present invention. The upper limit is not particularly significant except for safety purposes. Compositions that generate extremely high amounts of heat can be used.

The particular chemical composition selected will determine to a large extent the ratio of carrier to exothermic composition used. The amount of chemical composition used can range from about 5% to about 75% by weight. However it is preferred to have less than 50% chemical composition and generally 10% to 40% chemical composition in order to provide for a controlled exposure of the chemical composition to water.

When too little carrier is used the chemical composition will dissolve extremely quickly, quickly generating heat but then going cold. Such is believed to be undesirable and would require repeated application of the treatment of the present invention.

If too little chemical composition is used, i.e., less than 5%, very little heat would be generated and less sensitive fish may not detect the lure treatment. Therefore the effectiveness of the lure will be substantially reduced. Of course with exothermic compositions which are extremely exothermic lesser amounts can be employed. With chemical compositions that have a heat of solution of around 0.5 kcal/mole much more would be applied in order to generate sufficient heat.

Chemicals which are exothermic upon solution and are water soluble of course are well known. Exemplary compositions include $ZnCl_2$, $ZnSO_4$, $CuSO_4$, $NiSO_4$, $CaCl_2$, $FeCl_3$, $MgCl_2$, $NaOH$, $Na_2CO_3$, $NH_4C_2H_3O_2$, $LiOH$, $LiCl$, $LiClO_4$, $LiBr$, $LiI$, $LiNO_2$, $NaI$, $NaC_2H_3O_2$, $KOH$, $KF$.

Since the composition is going to be used in a very small amount, environmental safety should be considered accordingly. The preferred exothermic composition would be one which is totally environmentally safe. Suitable compositions include iron chloride, magnesium chloride, sodium hydroxide, potassium hydroxide, sodium carbonate and calcium chloride. Magnesium chloride is believed to be preferred.

Of course one critical concern is to avoid selection of a composition which is toxic to humans. Although such a composition should effectively attract fish, once caught it would be undesirable to consume the fish. However, toxic compositions would still be effective.

The lure treatment of the present invention is prepared by simply physically mixing the carrier with the exothermic composition. This should be of course done in a dry environment to avoid moisture from partially dissolving the exothermic composition. As indicated the composition will include from 95% to 25% carrier and from 5% to 75% exothermic composition. The preferred amount of exothermic composition would range from about 10 to about 40%. However this can vary widely based on solubility of the exothermic composition and the heat of solution of the chemical composition.

For use of the present invention the formed treatment is simply rubbed on the fishing lure. The amount applied can vary widely. Basically a coating of the composition is all that is required. Thicker applications can be used but may affect the other characteristics of the lure such as its ability to float, ability to sink, and ability to reflect light.

With flies the easiest way to apply the treatment is simply rub a very small amount of the treatment onto any portion of the lure. The lure does not have to be coated entirely and care should be taken so as not to gum up the hackles of the fly.

The present invention will be further appreciated in light of the following example.

A fly treatment was formed by combining equal parts by mass of magnesium chloride, Dow Corning 200 liquid silicone grease and Alboline Liquifying Cleanser. Three fisherman set out on the Pierre Marquette river in Michigan. The fly treatment was used by the first fisherman with the other two fishermen fishing without it. All three fished through the same areas in a manner that would put each one through the area in each time slot. The fishing equipment was identical in terminal gear, in weight, length and artificials. During this period of time other people fishing these areas were experiencing approximately 4 to 6 strikes per 8 hours of fishing. Fish in the river at that time consisted of steelhead trout, Coho salmon and king salmon. The salmon were spawning and the steelhead were in the river to feed on salmon roe. During this period of time salmon do not feed due to the fact that their throats swell shut when they enter the spawning streams. This is a prime steelhead fishing period.

For four hours in the morning the first fisherman used the treatment compound and the other two did not. The fist fisherman hooked 3 steelhead in the first 45 minutes plus approximately one per 45 minutes of fishing thereafter. The other two combined had one hook up in four hours.

During the afternoon the treatment was not used by anyone. The three had combined total of three hookups in five hours.

On the next day the use of the treatment was alternated at various time intervals. In the first time interval the first fisherman used the treatment and the second and third fishermen did not. In the next time interval this was reversed. Over a four hour period of time the first fisherman used the treatment for two and one half hours. During this 2½ hours of time the first fisherman had four hookups while the second and third fishermen had none. The second and third fishermen used the treatment for one and one half hours of the four hours. During this one and one half period of time the second and third fishermen had four hookups combined while the first fisherman had none.

On the next day the three fishermen floated the same stretch of the Big Manastee River two times (4 hours A.M. and 4 hours P.M.). In the morning all three used treatment and had 10 hookups. In the afternoon trip no one used treatment and they experienced a total of 2 hookups combined.

Thus the present invention provides a treatment for fishing lures which increases the attraction of the fish for the lure. The use of this lure provides a very effective method to attract and catch fish.

The foregoing has been a description of the present invention as well as the best mode of practicing the invention currently known to the inventor. However, the inventor intends to be bound only by the claims wherein:

I claim:

1. In combination a fishing lure and a treatment applied to said lure said treatments comprising a water soluble chemical composition and means to gradually disperse said chemical composition when said treatment is in water;
   wherein said water soluble chemical composition has a negative heat of solution.

2. The combination claimed in claim 1 wherein said means to gradually disperse said chemical composition comprises a water insoluble gel and said chemical composition is mixed with said gel.

3. The combination claimed in claim 1 wherein said means to gradually disperse said chemical composition comprises oil and said water soluble chemical composition is mixed with said oil.

4. The combination claimed in claim 2 wherein said gel is selected from a group consisting of silicone grease, wax, fat, hydrocarbon grease, hydrocarbon oil, low molecular weight synthetic polymer gels and mixtures thereof.

5. The combination claimed in claim 1 wherein said water soluble chemical composition is selected from the group consisting of zinc chloride, zinc sulfate, copper sulfate, nickle sulfate, iron chloride, magnesium chloride, ammonium acetate, lithium hydroxide, lithium chloride, lithium chlorate, lithium bromide, lithium nitrate, lithium iodide, sodium hydroxide, sodium iodide, sodium carbonate, sodium acetate, potassium hydroxide, potassium fluoride, calcium chloride.

6. The combination claimed in claim 5 wherein said water soluble chemical composition is selected from the group consisting of iron chloride, magnesium chloride, sodium hydroxide, calcium chloride, sodium carbonate.

7. A method of catching fish wherein a treatment is applied to the fishing lure, said treatment comprising a water soluble chemical composition and means to gradually disperse said water soluble chemical composition when said treatment is in water wherein said means to disperse said chemical composition comprises a water insoluble gel and wherein said chemical composition comprises a water soluble chemical composition which upon dissolving in water generates heat and casting said lure into fish laden water.

* * * * *